United States Patent Office 3,223,585
Patented Dec. 14, 1965

3,223,585
PESTICIDAL MONOSULFUR HETEROCYCLIC COMPOSITIONS
Roger Williams Addor, Pennington, N.J., assignor to American Cyanamid Company, Stamford, Conn., a corporation of Maine
No Drawing. Filed Feb. 23, 1965, Ser. No. 434,680
5 Claims. (Cl. 167—33)

This application is a continuation-in-part of a copending application for U.S. Letters Patent, Serial No. 328,192, filed December 5, 1963, now abandoned.

The present invention relates to novel isomeric oximino monosulfur heterocyclic moieties and has for its principal object the utilization of such oximino compounds as the active component of a pesticidal composition.

The novel monosulfur heterocyclic compounds prepared in accordance with the present invention may be represented by either of the general formulas:

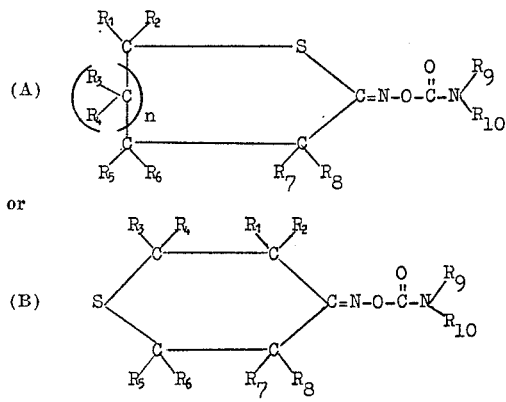

wherein $R_1$ to $R_8$ inclusive are substituents selected from the group consisting of hydrogen and lower alkyl; $n$ is an integer from 0 to 1; $R_9$ is lower alkyl and $R_{10}$ stands for hydrogen or lower alkyl.

In general, the compounds of Formula A above may be prepared in a sequence of the following steps: First, either a 4-halobutyronitrile or a 5-halovaleronitrile is reacted with a thiolalkanoic acid in substantially equimolar quantities and in the presence of a strong base to form a 4-acylthiobutyronitrile or a 5-acylthiovaleronitrile, respectively. The latter is then converted to the corresponding 5- or 6-membered heterocyclic compound by the utilization of either an aqueous protic acid, such as hydrochloric acid or sulfuric acid, or an alcoholic hydrohalide or bisulfate, whereby a 2-iminothiolane or a 2-iminothiane salt is formed. Either of the resultant 2-iminothiolane salt or the 2-iminothiane salt is next reacted with hydroxylamine to form a 2-oximinothiolane or a 2-oximinothiane. More conveniently, there is employed. In a final step, either a 2-oximinothiolane or a droxylamine hydrochloride or hydroxylamine hydrobromide in lieu of hydroxylamine. In that event, an equimolar amount of a base, such as sodium hydroxide, potassium hydroxide, sodium acetate or triethylamine, is employed. In a final step, either a 2-oximinothiolane or a 2-oximinothiane is reacted with either a lower alklylisocyanate or a carbamyl halide to form an alkyl carbamoyloxyiminothiolane or an alkyl carbamoyloxyiminothiane.

The over-all reaction with respect to Formula A may be graphically written as:

(I)

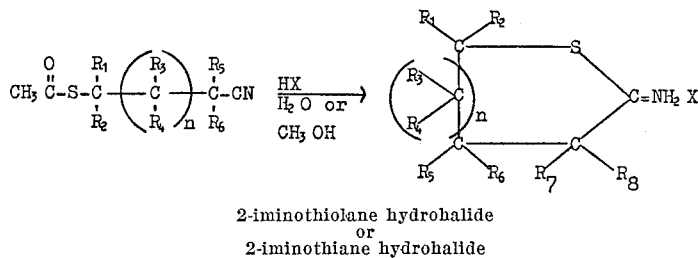

2-iminothiolane hydrohalide
or
2-iminothiane hydrohalide (II)

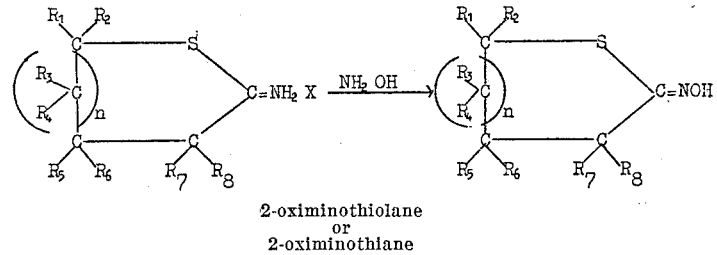

2-oximinothiolane
or
2-oximinothiane (IIIa)

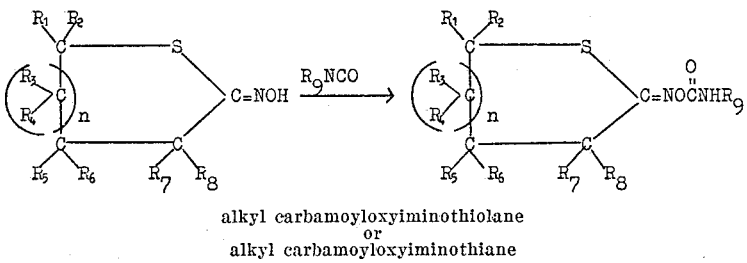

alkyl carbamoyloxyiminothiolane
or
alkyl carbamoyloxyiminothiane (IIIb)

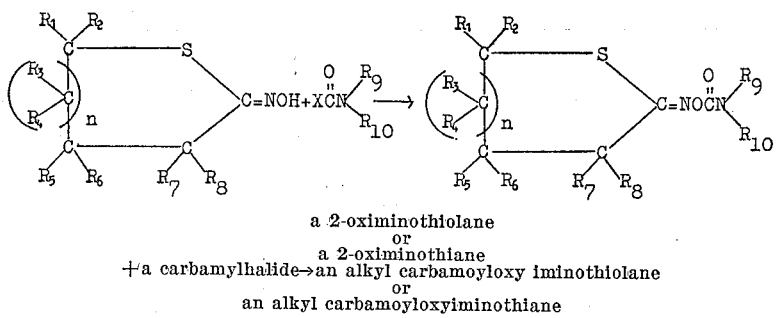

a 2-oximinothiolane
or
a 2-oximinothiane
+ a carbamylhalide → an alkyl carbamoyloxy iminothiolane
or
an alkyl carbamoyloxyiminothiane wherein each R is either hydrogen or lower alkyl, $n$ is an integer from 0 to 1, and X is a halogen atom, such as fluoro, chloro, bromo or iodo.

Advantageously, the compounds of Formula B above may be prepared, for instance, by treating 4-oximinothiane or a 4-oximino-alkyl substituted-thiane with either a lower alkyl isocyanate, such as methyl isocyanate or a lower alkylcarbamoyl halide, such as dimethylcarbamoyl chloride or bromide, in the manner hereinabove particularized with respect to the preparation of the compounds of Formula A. The 4-oximinothianes are known and are prepared, for example, by procedures set forth in the Journal of Organic Chemistry, vol. 20, page 871 (1955).

In each of the foregoing reaction steps, the initial reactants are advantageously present in equimolar quantities. The reactions may occur at temperatures ranging from about 20° C. to about 75° C., and the desired products are readily separated and recovered in good over-all yield and purity.

Illustrative of the isocyanate reactant there are included for instance: isocyanic acid, methyl isocyanate, ethyl isocyanate, propyl isocyanate, t-butyl isocyanate, n-pentyl isocyanate and n-hexyl isocyanate. As an alternative of the isocyanate reactant, there can be employed, for example: N,N-dimethylcarbamoyl bromide, N,N-diethylcarbamoyl iodide, homologs and isomers thereof.

Illustrative of the 4-halobutyronitrile and 5-halovaleronitrile reactants are:

4-fluorobutyronitrile,
4-bromobutyronitrile,
5-bromovaleronitrile,
4-chloro-3-methylbutyronitrile,
4-chlorobutyronitrile,
4-iodobutyronitrile,
5-bromo-5-ethylvaleronitrile, and
4-bromo-2,3-dimethylbutyronitrile.

The thioalkanoic acid which may be reacted with any of the aforementioned nitriles includes, for instance: thiolacetic acid, thiolpropionic acid and thiolbutyric acid.

To accelerate the formation of a carbamoyloxyimino derivative by reacting either an oximinothiolane or an oximinothiane with an alkyl isocyanate, trace amounts of a tertiary amine, such as triethylamine, tributylamine or pyridine, are advantageously employed. If a carbamyl halide is used instead of an alkyl isocyanate, an equimolar amount of the aforementioned base is employed.

To facilitate a further understanding of the invention, the following examples are presented primarily for purposes of illustrating certain more specific details thereof. The examples are not to be taken as limitative of the invention. Unless otherwise specified, all parts are by weight and the analyses are in percent.

EXAMPLE 1

Preparation of 4-acetylthiobutyronitrile

To a suitable water-cooled reaction flask containing 17 parts of potassium carbonate in 25 parts of water are added 10.5 parts of thiolacetic acid over a period of several minutes. The water bath is then removed and 50 parts by volume of ethanol are added to the reaction mixture. 18.2 parts of 4-bromobutyronitrile are then added over a two-hour period. The temperature of reaction rises to about 30° C. After about twelve hours, solids are collected which are washed with ethanol and with ether.

The combined filtrate and washes are diluted with from about 300 to 400 parts of water and the mixture is next extracted with an ether-benzene mixture. The ether-benzene phase is washed with water, dried and concentrated in vacuo. A yellow oil, 15.8 parts, which remains is distilled and four fractions totalling 13.7 parts of 4-acetylthiobutyronitrile are collected having a boiling point falling within the range from 58° C. to 63° C. at 0.05 mm. Hg to 0.10 mm. Hg. These fractions are homogeneous by infrared absorption and refractive indexes ($n_D^{25}$) for the four fractions vary from 1.4857 to 1.4898.

Substituting for the 4-bromobutyronitrile reactant, 5-bromovaleronitrile, the corresponding 5-acetylthiovaleronitrile is obtained in good yield and purity.

EXAMPLE 2

Preparation of 2-iminothiolane hydrochloride

To a suitable reaction vessel containing 74.8 parts of 4-acetylthiobutyronitrile in 200 parts by volume of methanol, are added 275 parts by volume of 2 N methanolic hydrogen chloride. The mixture is next stirred for approximately eighteen hours. The methanol is then distilled off and the reaction flask is ice-cooled. Thereafter, 250 parts by volume of ether are added and precipitated solids are collected, washed again with ether and 44 parts of colorless product are obtained.

When reacting 5-acetylthiovaleronitrile in lieu of 4-acetylthiobutyronitrile, the corresponding 2-iminothiane hydrochloride is obtained in good yield and purity.

EXAMPLE 3

Preparation of 2-oximinothiolane

In a suitable reaction vessel are stirred 10 parts of hydroxylamine hydrochloride and 150 parts by volume of 0.9 N methanolic potassium hydroxide. To the stirred mixture are next added 18.5 parts of 2-iminothiolane hydrochloride as prepared in Example 2 above. The mixture is then heated at reflux for one hour and thereafter cooled in an ice bath.

After cooling, approximately 75 parts by volume of benzene are added and solids precipitating are collected and washed with benzene. The organic layer is concentrated in vacuo and residual solids are extracted several times with ether. Evaporation of ether leaves 13.8 parts of crude oxime which is recrystallized from 50 parts by volume of benzene by slow cooling and seeding.

The mother liquor is reheated and then diluted with hexane to yield a second crop of crystals on cooling. The two fractions are next sublimed at 65° C. to 85° C. at 0.3 mm. Hg to yield 9.2 parts or 58 percent of theory of a colorless 2-oximinothiolane which possesses a melting point equal to 115.2° C. to 116.4° C.

In a similar fashion, 2-oximinothiane is prepared by utilizing as the reactant: 2-iminothiane hydrochloride in lieu of the 2-iminothiolane hydrochloride reactant employed above.

EXAMPLE 4

*Preparation of 2-methylcarbamoyloxyiminothiolane*

In a suitable reaction vessel are added 6 parts of 2-oximinothiolane and 50 parts by volume of dry ether containing about 0.1 part by volume of triethylamine. The vessel is then ice-cooled. To the so-cooled mixture are then added 3.6 parts by volume of methyl isocyanate. The reaction mixture is held for thirty minutes at 0° C. and then warmed to room temperature and stirred for about sixteen hours. A colorless crystalline compound forms, is collected and washed with ether. A yield of 7.1 parts, or 78 percent of theory, is obtained. Resultant compound, 2 - methylcarbamoyloxyiminothiolane, possesses a melting point equal to 95° C. to 99° C., and recrystallization from a benzene-hexane mixture increases the melting point of the compound so-prepared to 100° C. On analysis, the following is recorded in percent.

Calcd. for $C_6H_{10}N_2O_2S$: C, 41.3; H, 5.9; N, 16.1; S, 18.4. Found: C, 41.3; H, 5.9; N, 16.0; S, 18.3.

To obtain the corresponding 2-methylcarbamoyloxyiminothiane derivative in good yield, 2-oximinothiane is above employed in lieu of the 2-oximinothiolane reactant.

EXAMPLE 5

*Preparation of 2-ethylcarbamoyloxyiminothiolane*

Repeating the procedure of Example 4 in every detail, except that ethyl isocyanate is employed in lieu of the methyl isocyanate, a good yield of 2-ethylcarbamoyloxyiminothiolane is obtained.

EXAMPLE 6

*Preparation of 4-methylcarbamoyloxyiminothiane*

To a stirred mixture of 3.0 parts of 4-oximinothiane in 15 parts of ether containing about 0.1% triethylamine are added 1.6 parts of methyl isocyanate. The oil which separated after several hours crystallized when the mixture is ice-cooled. The solids are collected on a filter and amounts to 4.0 parts (95% of theory), melting point 75° C. to 79° C. Upon analysis, the following is found.

Calcd. for $C_7H_{12}N_2O_2S$: C, 44.66; H, 6.43; S, 17.03. Found: C, 44.46; H, 6.39; S, 17.06.

In a similar manner, substituting ethyl isocyanate for methyl isocyanate, 4-ethylcarbamoyloxyiminothiane is obtained in good yield as a crystalline solid.

EXAMPLE 7

*Preparation of 4-dimethylcarbamoyloxyiminothiane*

To 13.1 parts of 4-oximinothiane and 10.8 parts of dimethylcarbamoyl chloride in 100 parts of t-butanol are added 11.2 parts of potassium t-butoxide in 30 parts of t-butanol. After two hours, the mixture was poured into water and extracted with an ether-benzene mixture. The organic phase was dried over magnesium sulfate and concentrated in vacuo to give 18.0 parts (89%) of 4-dimethylcarbamoyloxyiminothiane as a viscous oil.

To demonstrate the effectiveness of the oximinothiolane and oximinothiane compounds as pre-emergence herbicides, the following test is conducted:

EXAMPLE 8

Seeds of corn, radish and wheat are exposed to the test compound in aqueous media. They are held in intimate contact for three weeks after which time observations are made on germination, deformation of the seedlings and kill. Employing the oximinothiolane and oximinothiane compounds of Example 3 above, all roots are killed at a concentration of 500 parts per million.

It is an advantage of the present invention that the compounds hereinabove defined can be utilized by incorporating them into a variety of inert carriers or diluents. For instance, each of the compounds can be dissolved in an inert organic solvent, such as acetone, ethyl acetate, ethyl alcohol, benzene, xylene, kerosene or equivalents thereof; or the compounds may be admixed with an inert solid carrier, as for example, fuller's earth, precipitated hydrated silicon dioxide, activated carbon, bentonite, Attaclay, Celite, kaolin clay, a mixture of bentonite and attapulgite, and the like. If desired, a suspension of the compounds may be prepared by employing a non-solvent therefor. In that event, it is advantageous to add thereto any commercially available dispersing or surface-active agent of the anionic, cationic or nonionic types, or mixtures of the same. Illustrative surface-active agents are: the alkylaryl sulfonates, the calcium salt of an oil-soluble sulfonate and polyoxyethylene ethers, such as "Emcol H–140," the sodium salt of a polymerized propyl naphthalene sulfonic acid, formed by condensing formaldehyde with a propyl naphthalene sodium sulfonate, the alkylaryl polyether alcohols, the ethylene oxide addition products of such esters as for instance "Tween–20" and the like. Usually, from one to five parts of dispersing agent per one-hundred parts of active compound is a good operating range.

The quantity of inert solid or liquid carrier or diluent employed with respect to the insecticidal compounds can be widely varied. It has, however, been found that, depending upon the carrier employed, from about 1% to about 80%, and preferably from about 20% to 70% by weight of the compound, based on the weight of the inert carrier, is wholly satisfactory.

The rate of application of the over-all composition as applied to foliage, soil or seed can be widely varied. For instance, when applied to foliage, a convenient rate is found to be between 0.25 and two pounds of active compound per acre. As to soil application, for both insecticidal and nematocidal activity, a good operating rate is found to be between one and ten pounds of active compound per acre. Finally, seeds can effectively be treated at a rate between about one to eight pounds by weight of the compound per one-hundred pounds of seed.

To demonstrate the effectiveness of the compounds of the present invention with respect to insecticidal the miticidal activity, the following examples are presented.

EXAMPLE 9

A 65/35 acetone-water mixture at concentrations equal to 0.1% and 0.01% active ingredient comprising either 2-methylcarbamoyloxyiminothiolane or 2- ethylcarbamoyloxyiminothiolane is prepared. Sieva lima bean plants with their first pair of leaves three to four inches in size are infested with approximately 100 to 200 adult mites per leaf about five hours prior to testing. The infested leaves are dipped into the test solutions for approximately three seconds, removed from said solution and permitted to dry. The dried leaves are then placed in separate dishes in a constant temperature room at 80° F. and 60% relative humidity for two days. After two days, each plant is examined and mortality counts are made. It is found that the above compounds, when applied at a concentration of 0.01%, produce one-hundred percent kill of adult mites.

EXAMPLE 10

Activity against nasturtium aphids is demonstrated by the following tests employing 0.1% and 0.01% solutions of 4-methylcarbamoyloxyiminothiane prepared in 50/50 acetone/water mixtures. Three-inch pots containing a nasturtium plant two inches tall and infested two days before are selected for testing. The pots are placed on a turntable held at four revolutions per minute (4 r.p.m.) and sprayed for two revolutions with No. 15 De Vilbiss atomizer at 20 p.s.i. air pressure. The spray tip is held about six inches from the plants and the spray is directed so as to give complete coverage of the aphids and the plants. The sprayed plants are laid on their side on white enamel trays (9½" x 13¼" x ¾") which have had the edges coated with No. 50 S.A.E. oil as a barrier. Mortality estimates are made after holding for two days at 70° F., 50% relative humidity. One hundred percent kill applied at the rates of 0.1% and 0.01% concentrate is achieved.

EXAMPLE 11

The effectiveness of 4-methylcarbamoyloxyiminothiane against the two-spotted spider mite is determined by employing a 0.1% solution in 65% acetone/35% water. Sieva lima bean plants with the first pair of leaves three to four inches in size are infested about five hours before testing, using about 100 to 200 adult mites per leaf. The infested leaves are dipped in the test solutions (in four-inch crystallizing dishes) for three seconds and the plants set in the hood to dry. The treated plants are held for two days at 80° F., 60% relative humidity and the adult mite mortality calculated by counting dead and alive adults on one leaf under the 10× binocularscope. The other leaf is held an additional five days and then is examined at 10× power to estimate the kill of eggs and newly-hatched nymphs, giving a measure of ovocidal and residual action, respectively. One hundred percent kill is obtained.

EXAMPLE 12

4-methylcarbamoyloxyiminothiane is made up as 1% dust by admixing 0.1 gram of the compound with 9.9 grams of talc, wetting with 5 milliliters of acetone and grinding in a mortar and pestle until dry. 125 milligrams of this 1% dust is then blown into the top of a dust settling tower with a short blast of air at 20 p.s.i. The dust is allowed to settle on four-inch petri dishes for two minutes. The dishes are removed and 25 adult confused flour beetles are added immediately. The dishes are held for three days at 80° F., 60% relative humidity, following which mortality counts are made. A 92% kill is recorded.

EXAMPLE 13

The 1% dusts as described in Example 12 above are employed wherein twenty-five milligrams of the 1% dust is sprinkled evenly over the bottom of a seven-inch crystallizing dish using a screen-bottom plastic cup about ⅝ inch in diameter as an applicator. Twenty adult Milkweed bugs are added and a screen cover put on the dish. Water is supplied in 2-ounce bottles with a cotton wick. Mortality counts are made after holding for three days at 80° F., 60% relative humidity. Eighty percent kill is recorded.

I claim:

1. An insecticidal and miticidal composition consisting essentially of an inert carrier and an effective amount of an oximino heterocyclic nonosulfur compound of the formula and selected from the group consisting of:

(A)

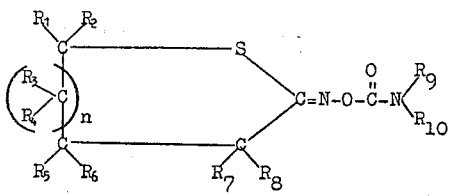

and (B)

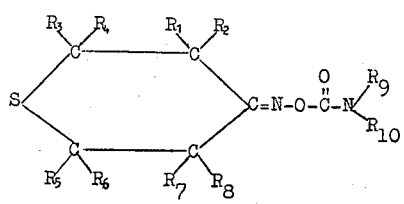

wherein each $R_1$ to $R_8$ is a substituent selected from the group consisting of hydrogen and lower alkyl; $R_9$ represents a substituent selected from the group consisting of hydrogen and lower alkyl; $R_{10}$ stands for lower alkyl and $n$ is an integer from 0 to 1.

2. A composition according to claim 1, in which the oximino compound is: 2-methylcarbamoyloxyiminothiolane.

3. A composition according to claim 1, in which the oximino compound is: 2-ethylcarbamoyloxyiminothiolane.

4. A composition according to claim 1, in which the oximino compound is: 2-methylcarbamoyloxyiminothiane.

5. A composition according to claim 1, in which the oximino compound is: 4-methylcarbamoyloxyiminothiane.

References Cited by the Examiner
UNITED STATES PATENTS

| | | | |
|---|---|---|---|
| 2,205,558 | 6/1940 | Flett | 167—33 |
| 2,790,811 | 4/1957 | Howard | 260—327 |
| 2,940,979 | 6/1960 | Sprague | 260—327 |
| 3,139,439 | 6/1964 | Olin | 260—327 |
| 3,183,148 | 5/1965 | Cannon et al. | 167—33 |

JULIAN S. LEVITT, *Primary Examiner.*

UNITED STATES PATENT OFFICE
CERTIFICATE OF CORRECTION

Patent No. 3,223,585                                    December 14, 1965

Roger Williams Addor

It is hereby certified that error appears in the above numbered patent requiring correction and that the said Letters Patent should read as corrected below.

Column 2, line 21, for "ployed. In a final step, either a 2-oximinothiolane or a" read -- ployed as the reactant a hydroxylamine salt, such as hy- --.

Signed and sealed this 27th day of September 1966.

(SEAL)
Attest:

ERNEST W. SWIDER                                  EDWARD J. BRENNER
Attesting Officer                                       Commissioner of Patents